I. L. GRIFFITH.
COIL INSULATING DEVICE.
APPLICATION FILED JUNE 4, 1915.
1,308,064.
Patented July 1, 1919.
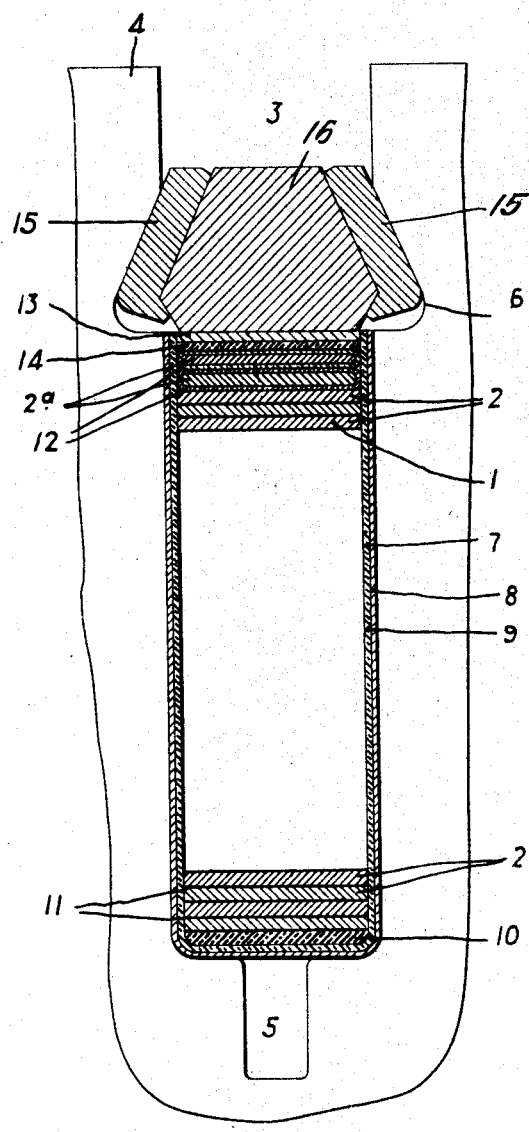
WITNESSES:
PJRidge.
O.W.Kennedy
INVENTOR
Israel L. Griffith.
BY
Wesley G. Carr
ATTORNEY

UNITED STATES PATENT OFFICE.

ISRAEL L. GRIFFITH, OF PITTSBURGH, PENNSYLVANIA, ASSIGNOR TO WESTINGHOUSE ELECTRIC AND MANUFACTURING COMPANY, A CORPORATION OF PENNSYLVANIA.

COIL-INSULATING DEVICE.

1,308,064.     Specification of Letters Patent.     Patented July 1, 1919.

Application filed June 4, 1915. Serial No. 32,225.

*To all whom it may concern:*

Be it known that I, ISRAEL L. GRIFFITH, a citizen of the United States, and a resident of Pittsburgh, in the county of Allegheny and State of Pennsylvania, have invented a new and useful Improvement in Coil-Insulating Devices, of which the following is a specification.

My invention relates to supporting and insulating devices for the coils of dynamo-electric machines, and it has for its object to provide a device of the character specified that shall be strong and durable and simple in construction.

In the construction of rotating field-magnet members for large high-speed turbo generators, it has been customary to embed the conductors forming the coils of the field-magnet winding in deep slots provided in the core structure and to provide suitable wedging means for retaining the coils securely within the slots. Owing to the high stresses developed by centrifugal force during the operation of such machines, it is essential that the coil-retaining devices be very rugged in construction and that the coils fit tightly within the slots. Consequently, the insulating material provided between the coils and the walls of the slots is subjected to severe mechanical stresses when the coil-retaining devices are driven into the slots. The usual insulating materials, such as fiber board or treated cloths and papers, do not have sufficient mechanical strength to be used successfully in providing insulation between the coils and the walls of the slots.

By my invention, I provide coil-insulating and protective devices or cells that are adapted to be interposed between the coils and the walls of the slots and are of sufficient mechanical strength to withstand any abnormal stresses which may be caused by the wedging action between the coils and the walls of the slots or by the application of the coil-retaining devices.

In the accompanying drawing, the single figure is a fragmentary sectional view of a portion of the rotating field-magnet member of a turbo-generator embodying a coil-insulating cell constructed in accordance with my invention.

A field-magnet coil 1 comprises a plurality of strap conductors 2 that are located in a slot 3 provided in a magnetizable core member 4 of a field-magnet structure. The slot 3 is formed with a reduced portion 5 at the bottom thereof and with oppositely disposed inclined notches 6 adjacent to the outer periphery of the core member 4. A coil-insulating cell 7 comprises a U-shaped metallic member 8 that is adapted to fit closely within the slot 3. The U-shaped member 8 is formed, preferably, of sheet steel and is provided, on its inner surface, with a layer 9 of insulation. The insulation 9 is, preferably, in the form of sheets of built-up mica which are applied to the U-shaped member 8 with an adhesive binder and in conjunction with a suitable molding device. After the application of the mica, the mold is subjected to pressure so that the layer 9 of insulation and the U-shaped member 8 form a substantially unitary structure.

In assembling a field-magnet coil, the insulating cell 7 is forced into the slot 3 and a plurality of sheets 10 of mica insulation are disposed in the bottom portion thereof so that the cell 7 has a substantially uniform width above the insulation 10. The strap conductors 2 are then assembled within the cell, with layers 11 of suitable insulating material such as asbestos or mica interposed between the individual conductors. A plurality of conductors $2^a$, at the upper portion of the cell 7, are of less width than the conductors 2 and are wrapped with suitable insulating tape 12 so that they are adapted to fit closely within the insulating cell 7. A metallic pressure plate 13, preferably of sheet brass, is inserted at the top of the cell 7 and is separated from the upper conductor $2^a$ by a layer 14 of hard and durable insulation material, such as baked sheet mica. A plurality of coacting wedging members 15 and 16 are then driven into the notches 6 to retain the coil 1 within the slot 3.

The layer 9 of mica within the cell 7, by reason of its yielding nature, may be compressed to a certain degree so that irregularities on the surfaces of the conductors 2 or any distortion in the form thereof caused by the application of the wedging members 15 and 16 will be compensated for without appreciable damage to the insulating properties of the cell. Furthermore, the metallic member 8 will effectively protect the insulation 9 from external injury, such as might be caused by the fraying action of the currents of a ventilating medium passing through the reduced portion 5 at the bottom of the slot 3. The insulating cell 7 is also adapted to withstand a relatively high degree of heat, being formed of substantially non-combustible and non-fusible materials.

While I have shown my invention in its preferred form, it is not so limited but is susceptible of various modifications and changes within the scope of the appended claims.

I claim as my invention:

1. In a dynamo-electric machine, the combination with a slotted core structure having ventilating ducts located at the bases of the slots thereof, members of substantially U-shape disposed within said slots and constituting walls of said ventilating ducts, coils disposed within said members, and means adapted to exert a wedging action on said coils to retain them in position.

2. In a dynamo-electric machine, the combination with a slotted core structure having ventilating ducts located at the bases of the slots thereof of a metallic member of U-shape disposed within each of said slots and constituting one wall of the adjacent ventilating ducts, coils disposed within said members, and means adapted to exert a wedging action on said coils to retain them in position.

3. In a dynamo-electric machine, the combination with a slotted core structure, of sheet-metal cells lined with insulating material and disposed within the slots of said structure, coils located in said cells, and a plurality of coil-retaining means coacting with each other to produce a wedging action on said coils to retain them in position.

4. In a dynamo-electric machine, the combination with a slotted core structure having ventilating ducts located at the bases of the slots of said structure, of sheet-metal cells lined with compressible layers of mica and disposed within said slots to constitute side walls of said ventilating ducts, coils disposed within said cells, and a plurality of coil-retaining means adapted to coact with each other and with the sides of the slots to produce a wedging action on said coils.

5. In a dynamo-electric machine, the combination with a slotted core structure having ventilating ducts located at the bases of the slots thereof, of sheet-metal cells lined with sheets of mica bonded together and disposed within said slots to constitute walls of said ventilating ducts, coils disposed within said cell, and a plurality of coil-retaining means coacting with each other and the sides of the slots to produce a wedging action on said coils.

6. In a dynamo-electric machine, the combination with a slotted core structure, of sheet-metal cells lined with insulating material and disposed within the slots thereof, coils located in said slots, coil-retaining means adapted to exert a pressure on said coils, and pressure plates disposed intermediate said coils and said coil-retaining means.

In testimony whereof, I have hereunto subscribed my name this 27th day of May 1915.

ISRAEL L. GRIFFITH.